Patented Feb. 12, 1946

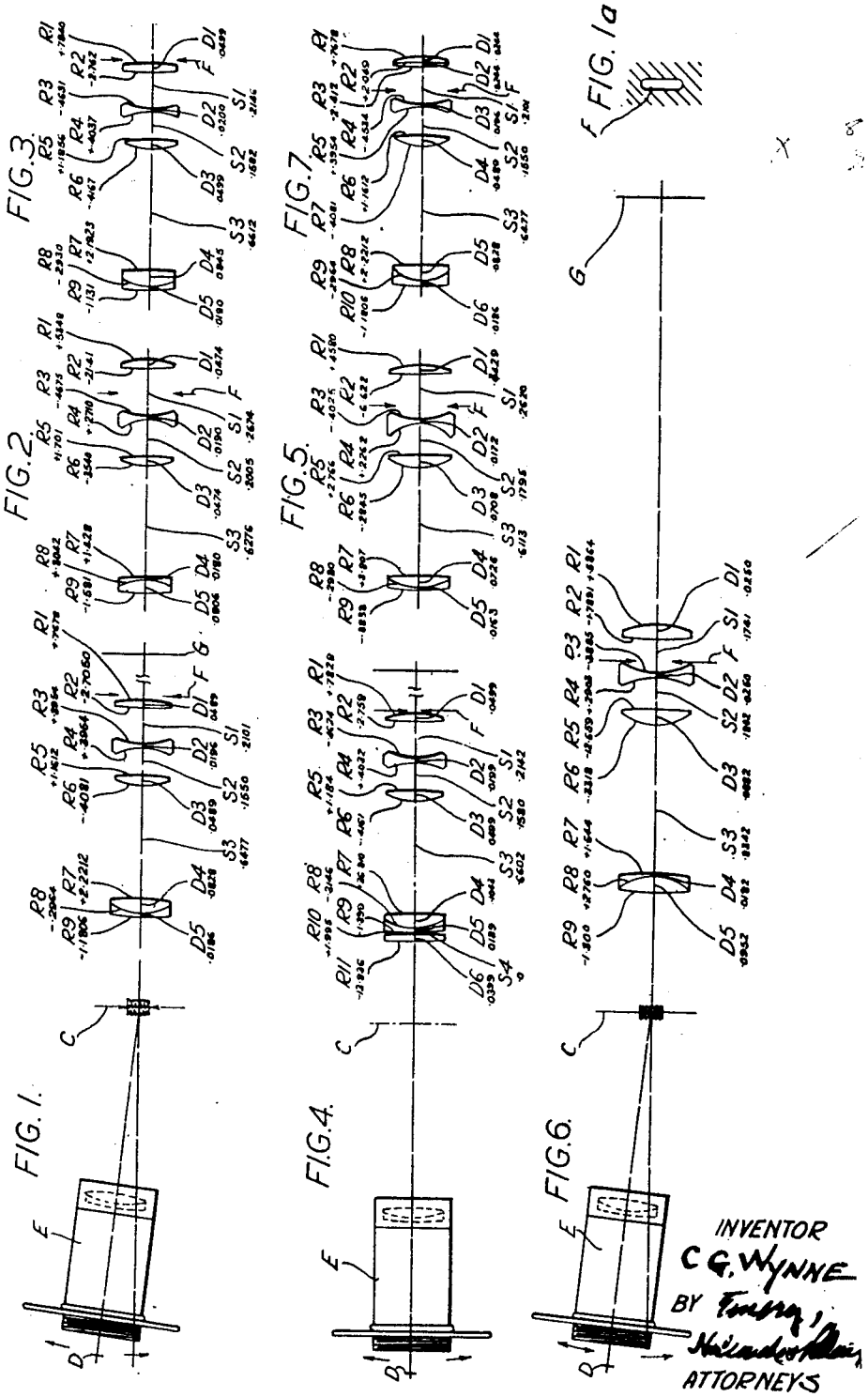

Search Room 2,394,959

UNITED STATES PATENT OFFICE 2,394,959

OPTICAL SYSTEM

Charles Gorrie Wynne, Leicester, England, assignor to Taylor, Taylor & Hobson Limited, Leicester, England, a company of Great Britain Application July 21, 1942, Serial No. 451,755
In Great Britain July 22, 1941

20 Claims. (Cl. 88—57)

This invention relates to an optical system, intended more especially for use in what may be termed "shadow projection," that is in projecting an image of the profile of a solid object illuminated by collimated light from a source on the side of the object remote from the system, the optical system being of the kind corrected for spherical and chromatic aberration (including oblique colour), coma, astigmatism, field curvature and distortion, and comprising two convergent members of which the front member consists of three separated components, namely a divergent component located between two convergent components, whilst the rear member constitutes a field member and may consist of a single compound component, or of two or more components with only relatively small air separations, the axial separation between the rear surface of the front member and the front surface of the field member being greater than half the equivalent focal length of the whole system. It should be made clear that the "front" of the system is the side of the longer conjugate in accordance with the usual convention (so that when the system is used for profile projection purposes the light will pass through the system from the rear to the front). The field member is adapted, when the system is used for profile projection, to form an image of the light source at the optical stop.

It is to be understood that the term "component" is used herein to indicate a part of the system (whether consisting of a single lens element or compounded of two or more lens elements) separated by substantial air gaps from the other parts of the system. It is further to be understood that the terms "compounded" and "contact surface" are used herein whether or not the two cooperating surfaces together constituting the "contact surface" between each pair of elements have exactly the same curvature and whether or not cement is actually employed to connect the surfaces with one another.

British patent specification No. 444,350 gives examples of an optical system of the above-mentioned kind, which satisfactorily effect profile projection so long as the incident collimated beam is substantially parallel to the optical axis of the system.

The present invention has for its object to provide an improved optical system of the above kind which will be suitable inter alia for the projection of the profile of an axial section of a screwthread, wherein it is desirable for the optical axis of the system to be at right angles to the thread axis and for the illuminating beam to be inclined at the mean helix angle to such optical axis.

To attain this object according to the invention the radius of curvature of the front surface of the rear convergent component of the front member should lie between .75 and 3.0 times the equivalent focal length of the whole system. If profile projection at high magnification is required, it is preferable for such radius to be less than 1.75 times the equivalent focal length, and also for the power of a collective contact surface in the field member to be greater than .25 times the equivalent power of the system. It is to be understood that the term "power" herein used refers to the optical power, that is the reciprocal of the focal length. The two members are preferably separately achromatised.

The two members of the system are preferably so arranged that the exit pupil of the system, when used for profile projection, lies within the front member or only a short distance outside such member. When collimated light is used to illuminate the object whose profile is to be projected, the objective will form an image of the light source at the exit pupil, and if the source itself is of suitable small size, such image will act as a stop. In practice, however, it will usually be preferable to provide an actual stop in this position, and when the object under examination is a screwthread and the illuminating device is inclined at the appropriate angle to the optical axis to suit the helix angle of the thread, the stop is preferably elongated in the plane containing the optical axes of the system and of the illuminating device, to allow for the increased displacement of the image of the light source in such plane due to the inclination of the beam.

Another object of the invention is to provide a complete profile projection apparatus for the examination of screwthreads, by projecting an image of the profile of an axial section of the thread.

Further objects of the invention will be apparent from the appended claims and from the following description of the accompanying drawing, in which Figure 1 shows diagrammatically a complete profile projection apparatus according to the invention, Figure 1a is a detail view of a part thereof, Figures 2 and 3 show alternative forms of optical system for use in the apparatus shown in Figure 1, and Figures 4 to 7 show further variants of the optical system, those of Figures 4 and 6 being illustrated in their operative positions in a complete projection apparatus.

In the construction of Figures 1 and 2, the projection apparatus comprises a convergent field member A and a convergent front member B, together constituting the optical system, the field member A consisting of a cemented doublet formed of a convergent element in front of a divergent element, whilst the front member B consists of a separated triplet formed of a divergent element located between two convergent elements.

The object, whose profile is to be examined, is disposed behind the optical system in the object plane indicated at C, and is illuminated by a collimated beam of light projected from a lamp filament D of small size by means of a collimator E. Although the apparatus can be employed generally for profile projection, it is more especially intended for projecting an image of the profile of an axial section of a screwthread, and the apparatus is illustrated in the drawing with reference to its use for this purpose.

The screwthread under examination is mounted in a suitable support with its axis lying in the object plane C, and the illuminating device, comprising collimator and lamp filament, is disposed with its optical axis inclined to the axis of the optical system AB at an angle equal to the mean helix angle of the screwthread, such helix angle of course varying from the crest to the hollow of the thread. Owing to the fact that the lamp filament D, though small, is of finite size, the rays from the collimator E will not all be parallel to its axis and in fact a bundle of parallel rays at a slight angle to such axis will emerge from the collimator from every point of the filament, the angle depending on the distance of the point from the axis of the collimator. The size of the filament is so chosen that such angular deviation will cover the difference between the helix angles at the crest and in the hollow of the thread. For example the illuminating device may be inclined at an angle of 6° to the optical axis of the system AB to suit the mean helix angle of the thread, and the size of the filament may be such as to give an angular spread on either side of the axis of 2° to cover the variations of the helix angle. The extreme rays in the plane containing the axes of the illuminating device, the screwthread and the optical system will thus be inclined at 8° to the optical axis of the system, whilst the extreme rays in the plane at right angle to such plane will be inclined at 2° to the optical axis. The image of the filament produced at the exit pupil of the optical system will thus be elongated, and a stop F with an aperture of the appropriate shape shown in Figure 2, is provided at such exit pupil to suit such image. Thus such stop aperture may have a breadth F/14 corresponding to the 2° and a length F/3.6 corresponding to the 8°. In practice, the stop aperture should be made slightly larger than the filament image to avoid diffraction difficulties.

In order to be applicable to the examination of screwthreads of different helix angles, the illuminating device is preferably pivoted about a point on the optical axis of the system AB, so that it can be adjusted to any desired small inclination. The elongated stop F may be removable to permit substitution of other stops of appropriate aperture shapes to suit different inclinations of the illuminating device or alternatively the stop may consist of a pair of overlapping slotted leaves mutually adjustable to vary the length of the stop aperture as required. The actual position of the pivot for the illuminating device on the axis of the optical system is not important, provided that the collimator lens is large enough to illuminate the object throughout the range of angular adjustment, but it will commonly be convenient for such pivot axis to lie in or close to the object plane of the system. It will be clear that with this arrangement an image of the profile of an axial section of the screwthread will be projected by the optical system on to a projection screen in the image plane G of the optical system. The optical system may be designed to give a high magnification, say ×50, on a distant screen, as in the construction shown in Figure 1, or alternatively a lower magnification on a nearer screen.

The arrangement of the optical system may vary to suit different requirements, and numerical data for a number of convenient practical examples are given in the following tables, the first example corresponding to that shown in Figure 1, whilst the remaining examples are illustrated in the correspondingly numbered figures of the drawing. In these tables $R_1, R_2 \ldots$ represent the radii of curvature of the individual surfaces counting from the front (the positive sign indicating that the surface is convex to the front and the negative sign that it is concave thereto), $D_1, D_2 \ldots$ represent the axial thicknesses of the individual elements, and $S_1, S_2, S_3$ represent the axial air separations between the components. The tables also give the mean refractive index $n_D$ (for the D-line) and the Abbé V number for the glass used for each element.

*Example I*

[Equivalent focal length 1.000, relative aperture F/16]

| Radius | Thickness or air separation | Refractive index $n_D$ | Abbé V number |
| --- | --- | --- | --- |
| $R_1 +.7678$ | $D_1$ .0489 | 1.6142 | 55.5 |
| $R_2 -2.7050$ | $S_1$ .2101 | | |
| $R_3 -.4535$ | $D_2$ .0196 | 1.6715 | 32.2 |
| $R_4 +.3954$ | $S_2$ .1550 | | |
| $R_5 +1.1612$ | $D_3$ .0489 | 1.6443 | 48.4 |
| $R_6 -.4081$ | $S_3$ .6477 | | |
| $R_7 +2.2212$ | $D_4$ .0828 | 1.613 | 59.3 |
| $R_8 -.2964$ | $D_5$ .0186 | 1.6973 | 30.5 |
| $R_9 -1.1806$ | | | |

Example II

[Equivalent focal length 1.000, relative aperture F/16]

| Radius | Thickness or air separation | Refractive index $n_D$ | Abbé V number |
|---|---|---|---|
| $R_1$+.5348 | $D_1$ .0474 | 1.6142 | 55.5 |
| $R_2$−21.40 | $S_1$ .2674 | | |
| $R_3$−.4675 | $D_2$ .0190 | 1.6715 | 32.2 |
| $R_4$+.2710 | $S_2$ .2005 | | |
| $R_5$+1.701 | $D_3$ .0474 | 1.6443 | 48.4 |
| $R_6$−.3540 | $S_3$ .6276 | | |
| $R_7$+1.428 | $D_4$ .0180 | 1.6973 | 30.5 |
| $R_8$+.3042 | $D_5$ .0806 | 1.613 | 57.6 |
| $R_9$−1.581 | | | |

Example III

[Equivalent focal length 1.000, relative aperture F/16]

| Radius | Thickness or air separation | Refractive index $n_D$ | Abbé V number |
|---|---|---|---|
| $R_1$+.7840 | $D_1$ .0499 | 1.6142 | 55.5 |
| $R_2$−2.762 | $S_1$ .2146 | | |
| $R_3$−.4631 | $D_2$ .0200 | 1.6715 | 32.2 |
| $R_4$+.4037 | $S_2$ .1582 | | |
| $R_5$+1.1856 | $D_3$ .0499 | 1.6443 | 48.4 |
| $R_6$−.4167 | $S_3$ .6612 | | |
| $R_7$+2.1923 | $D_4$ .0845 | 1.574 | 59.4 |
| $R_8$−.2930 | $D_5$ .0190 | 1.652 | 33.5 |
| $R_9$−1.131 | | | |

The above examples are all intended for profile projection at high magnification (×50) using collimated light inclined to the axis of projection and employ a doublet for the field member. The radius $R_5$ is in each case between .75 and 1.75 and the power of the collective cemented surface $R_6$ in the field member is .284 in Example I, .277 in Example II and .266 in Example III. Examples I and II differ from one another primarily in that the field member in Example II has its divergent element in front of its convergent element, whilst in Example I the convergent element is in front of the divergent element. Example III differs from Example I mainly in the use of different glasses in the field member. In Examples I and III the stop F is just outside the front member at .017 in front of the front surface $R_1$, whilst in Example II the stop is within the front member at .126 in front of the front surface $R_3$ of the divergent element. The distances from the front surfaces $R_1$ to the image plane G and from the rear surface $R_9$ to the object plane C are respectively 49.0 and .489 in Example I, 49.8 and .473 in Example II and 50.0 and .498 in Example III.

In the fourth example, which is shown in Figure 4 in a complete projection apparatus, the field member is divided into two and consists of a convergent doublet in front of a separate convergent element. This example, which is likewise corrected for high magnification (×50) and is suitable for profile projection of a screwthread or the like illuminated by collimated light inclined to the axis of projection (although actually shown by way of example with its illuminating device in the axial position of adjustment), has its radius $R_5$ 1.18 whilst the power of the collective cemented surface $R_6$ is .268. In this example the stop is positioned at .017 in front of the surface $R_1$, the image plane is distant 50.0 in front of such surface and the object plane is .475 behind the rear surface $R_{11}$.

Example IV

[Equivalent focal length 1.000, relative aperture F/16]

| Radius | Thickness or air separation | Refractive index $n_D$ | Abbé V number |
|---|---|---|---|
| $R_1$+.7828 | $D_1$ .0499 | 1.6142 | 55.5 |
| $R_2$−2.758 | $S_1$ .2142 | | |
| $R_3$−.4624 | $D_2$ .0199 | 1.6715 | 32.2 |
| $R_4$+.4032 | $S_2$ .1580 | | |
| $R_5$+1.184 | $D_3$ .0499 | 1.6443 | 48.4 |
| $R_6$−.4161 | $S_3$ .6602 | | |
| $R_7$+36.810 | $D_4$ .1043 | 1.613 | 55.7 |
| $R_8$−.3146 | $D_5$ .0189 | 1.6973 | 30.5 |
| $R_9$−1.399 | $S_4$ 0 | | |
| $R_{10}$+1.995 | $D_6$ .0399 | 1.613 | 55.7 |
| $R_{11}$−13.836 | | | |

The following two examples differ from the foregoing examples, in that they are corrected for a low magnification (×3) and are suitable for use in microscope investigation of the profile of a screwthread or the like illuminated by collimated light inclined to the axis of projection. Both employ a doublet for the field member, the convergent element being in front of the divergent element in Example V and behind the divergent element in Example VI. These examples each have a relative large fifth radius, greater than 1.75 but less than 3.0, and the convergent power of the cemented surface $R_6$ is .283 in Example V but only .140 in Example VI. The stop position in each of these examples is within the front member at .075 in Example V and .004 in Example VI in front of the third surface $R_3$. In Example V the image plane is 2.694 in front of the front surface $R_1$ and the object plane is .693 behind the rear surface $R_9$, the corresponding figures for Example VI being 2.368 and .654 respectively.

Example V

[Equivalent focal length 1.000, relative aperture F/16]

| Radius | Thickness or air separation | Refractive index $n_D$ | Abbé V number |
|---|---|---|---|
| $R_1$+.4580 | $D_1$ .0429 | 1.6142 | 55.5 |
| $R_2$−6.622 | $S_1$ .2620 | | |
| $R_3$−.4025 | $D_2$ .0172 | 1.6715 | 32.2 |
| $R_4$+.2262 | $S_2$ .1795 | | |
| $R_5$+2.766 | $D_3$ .0708 | 1.613 | 53.3 |
| $R_6$−.2845 | $S_3$ .6113 | | |
| $R_7$+3.807 | $D_4$ .0726 | 1.613 | 55.5 |
| $R_8$−.2980 | $D_5$ .0163 | 1.6973 | 30.5 |
| $R_9$−.8838 | | | |

*Example VI*

[Equivalent focal length 1.000, relative aperture F/16]

| Radius | Thickness or air separation | Refractive index $n_D$ | Abbé V number |
|---|---|---|---|
| $R_1 +.5864$ | | | |
| | $D_1$ .0801 | 1.6125 | 59.3 |
| $R_2 -1.789$ | | | |
| | $S_1$ .1741 | | |
| $R_3 -.3885$ | | | |
| | $D_2$ .0250 | 1.6212 | 36.1 |
| $R_4 +.2903$ | | | |
| | $S_2$ .1802 | | |
| $R_5 +2.659$ | | | |
| | $D_3$ .0882 | 1.6125 | 59.3 |
| $R_6 -.3318$ | | | |
| | $S_3$ .8342 | | |
| $R_7 +1.644$ | | | |
| | $D_4$ .0182 | 1.6510 | 33.5 |
| $R_8 +.2760$ | | | |
| | $D_5$ .0952 | 1.6125 | 55.7 |
| $R_9 -1.300$ | | | |

It is not essential to the invention for the three components of the front member to consist of simple elements, and one or more of them may be made compound, if desired. One such arrangement is shown in Figure 7 with numerical data as in the following table.

*Example VII*

[Equivalent focal length 1.000, relative aperture F/16]

| Radius | Thickness or air separation | Refractive index $n_D$ | Abbé V number |
|---|---|---|---|
| $R_1 +.7678$ | | | |
| | $D_1$ .0244 | 1.6142 | 55.5 |
| $R_2 +2.049$ | | | |
| | $D_2$ .0244 | 1.584 | 56.2 |
| $R_3 -2.412$ | | | |
| | $S_1$ .2101 | | |
| $R_4 -.4535$ | | | |
| | $D_3$ .0196 | 1.6715 | 32.2 |
| $R_5 +.3954$ | | | |
| | $S_2$ .1550 | | |
| $R_6 +1.1612$ | | | |
| | $D_4$ .0489 | 1.6443 | 48.4 |
| $R_7 -.4081$ | | | |
| | $S_3$ .6477 | | |
| $R_8 +2.2212$ | | | |
| | $D_5$ .0828 | 1.613 | 59.3 |
| $R_9 -.2964$ | | | |
| | $D_6$ .0816 | 1.6973 | 30.5 |
| $R_{10} -1.1806$ | | | |

In this example the position of the stop F, the distance from the front surface $R_1$ to the image plane, and the distance from the rear surface $R_{10}$ to the object plane, are substantially the same as the corresponding dimensions given above for Figure 1.

It will be appreciated that although the arrangements have been described more especially with reference to their use in examining screw-threads, they can also be usefully employed for other profile projection purposes.

What I claim as my invention and desire to secure by Letters Patent is:

1. An optical system corrected for spherical and chromatic aberrations, coma, astigmatism, field curvature and distortion, and comprising two convergent members in axial alignment, the front member consisting of a divergent component located between two convergent components whilst the rear member constitutes a field member and consists of at least two elements, the axial separation between the rear surface of the front member and the front surface of the field member being greater than half the equivalent focal length of the whole system, whilst the radius of the front surface of the rear convergent component of the front member lies between .75 and 3.0 times the equivalent focal length of the whole system.

2. An optical system as claimed in claim 1, in which the radius of curvature of the front surface of the rear convergent component of the front member is less than 1.75 times the equivalent focal length of the whole system.

3. An optical system as claimed in claim 1, in which the field member includes a collective contact surface whose power is greater than .25 times the equivalent power of the whole system, and in which the radius of curvature of the front surface of the rear convergent component of the front member is less than 1.75 times the equivalent focal length of the whole system.

4. An optical system as claimed in claim 1, in which the two members are separately achromatised.

5. An optical system corrected for spherical and chromatic aberrations, coma, astigmatism, field curvature and distortion, and comprising two separately achromatised convergent members in axial alignment, the front member consisting of a divergent component located between two convergent components whilst the rear member constitutes a field member and consists of a convergent element compounded with a divergent element, the axial separation between the rear surface of the front member and the front surface of the field member being greater than half the equivalent focal length of the whole system, whilst the radius of curvature of the front surface of the rear convergent component of the front member lies between .75 and 3.0 times the equivalent focal length of the whole system.

6. An optical system corrected for spherical and chromatic aberrations, coma, astigmatism, field curvature and distortion, and comprising two separately achromatised convergent members in axial alignment, the front member consisting of a divergent component located between two convergent components whilst the rear member constitutes a field member and includes a compound component having a collective contact surface whose power is greater than .25 times the equivalent power of the whole system, the radius of curvature of the front surface of the rear convergent component of the front member lying between .75 and 1.75 times the equivalent focal length of the whole system.

7. An optical system corrected for spherical and chromatic aberrations, coma, astigmatism, field curvature and distortion and comprising two convergent members in axial alignment, the front member consisting of a divergent component located between two convergent components whilst the rear member constitutes a field member and consists of a convergent element cemented in front of a divergent element the power of the cemented surface being greater than .25 times the equivalent power of the whole system, the axial separation between the rear surface of the front member and the front surface of the field member being greater than half the equivalent focal length of the whole system, whilst the radius of curvature of the front surface of the rear convergent component of the front member lies between .75 and 3.0 times the equivalent focal length of the whole system.

8. An optical system corrected for spherical and chromatic aberrations, coma, astigmatism, field curvature and distortion, and comprising two convergent members in axial alignment, the front member consisting of a divergent component located between two convergent components whilst the rear member constitutes a field member and consists of a convergent element compounded with and disposed in front of a divergent element, the radius of curvature of the front surface of the rear convergent component of the front member lying between .75 and 1.75 times the equivalent focal length of the whole system.

9. An optical system corrected for spherical and chromatic aberrations, coma, astigmatism, field curvature and distortion, and comprising two convergent members in axial alignment, the front member consisting of a divergent component located between two convergent components whilst the rear member constitutes a field member and consists of a convergent element compounded and disposed behind a divergent element, the axial separation between the rear surface of the front member and the front surface of the field member being greater than half the equivalent focal length of the whole system, whilst the radius of curvature of the front surface of the rear convergent component of the front member lies between .75 and 3.0 times the equivalent focal length of the whole system.

10. An optical system corrected for spherical and chromatic aberrations, coma, astigmatism, field curvature and distortion, and comprising two convergent members in axial alignment, the front member consisting of a divergent component located between two convergent components whilst the rear member constitutes a field member and consists of a doublet disposed close to a separate convergent element the axial separation between the rear surface of the front member and the front surface of the field member being greater than half the equivalent focal length of the whole system, whilst the radius of curvature of the front surface of the rear convergent component of the front member lies between .75 and 3.0 times the equivalent focal length of the whole system.

11. An optical system corrected for spherical and chromatic aberrations, coma, astigmatism, field curvature and distortion, and comprising two convergent members in axial alignment, the front member consisting of a divergent component located between two convergent components whilst the rear member constitutes a field member and consists of a doublet disposed close to a separate convergent element the contact surface in such doublet having collective power greater than .25 times the equivalent power of the whole system, whilst the radius of curvature of the front surface of the rear convergent component of the front member lies between .75 and 1.75 times the equivalent focal length of the whole system.

12. An optical system as claimed in claim 8, having numerical data substantially as set forth in the following table:

[Equivalent focal length 1.000, relative aperture F/16]

| Radius | Thickness or air separation | Refractive index $n_D$ | Abbé V number |
|---|---|---|---|
| $R_1$+.7678 | $D_1$ .0489 | 1.6142 | 55.5 |
| $R_2$−2.7050 | $S_1$ .2101 | | |
| $R_3$−.4535 | $D_2$ .0196 | 1.6715 | 32.2 |
| $R_4$+.3954 | $S_2$ .1550 | | |
| $R_5$+1.1612 | $D_3$ .0489 | 1.6443 | 48.4 |
| $R_6$−.4081 | $S_3$ .6477 | | |
| $R_7$+2.2212 | $D_4$ .0828 | 1.613 | 59.3 |
| $R_8$−.2964 | $D_5$ .0186 | 1.6973 | 30.5 |
| $R_9$−1.1806 | | | | wherein $R_1, R_2 \ldots$ represent the radii of curvature of the individual surfaces counting from the front (the positive sign indicating that the surface is convex to the front and the negative sign that it is concave thereto), $D_1, D_2 \ldots$ represent the axial thicknesses of the individual elements, and $S_1, S_2, S_3$ represent the axial air separations between the components.

13. An optical system as claimed in claim 9, having numerical data substantially as set forth in the following table:

[Equivalent focal length 1.000, relative aperture F/16]

| Radius | Thickness or air separation | Refractive index $n_D$ | Abbé V number |
|---|---|---|---|
| $R_1$+.5864 | $D_1$ .0801 | 1.6125 | 59.3 |
| $R_2$−1.789 | $S_1$ .1741 | | |
| $R_3$−.3885 | $D_2$ .0250 | 1.6212 | 36.1 |
| $R_4$+.2903 | $S_2$ .1802 | | |
| $R_5$+2.659 | $D_3$ .0882 | 1.6125 | 59.3 |
| $R_6$−.3318 | $S_3$ .8342 | | |
| $R_7$+1.644 | $D_4$ .0182 | 1.6510 | 33.5 |
| $R_8$+.2760 | $D_5$ .0952 | 1.6125 | 55.7 |
| $R_9$−1.300 | | | | wherein $R_1, R_2 \ldots$ represent the radii of curvature of the individual surfaces counting from the front (the positive sign indicating that the surface is convex to the front and the negative sign that it is concave thereto), $D_1, D_2 \ldots$ represent the axial thicknesses of the individual elements, and $S_1, S_2, S_3$ represent the axial air separations between the components.

14. An optical system as claimed in claim 10, having numerical data substantially as set forth in the following table:

[Equivalent focal length 1.000, relative aperture F/16]

| Radius | Thickness or air separation | Refractive index $n_D$ | Abbé V number |
|---|---|---|---|
| $R_1$+.7828 | $D_1$ .0499 | 1.6142 | 55.5 |
| $R_2$−2.758 | $S_1$ .2142 | | |
| $R_3$−.4624 | $D_2$ .0199 | 1.6715 | 32.2 |
| $R_4$+.4032 | $S_2$ .1580 | | |
| $R_5$+1.184 | $D_3$ .0499 | 1.6443 | 48.4 |
| $R_6$−.4161 | $S_3$ .6602 | | |
| $R_7$+36.810 | $D_4$ .1043 | 1.613 | 55.7 |
| $R_8$−.3146 | $D_5$ .0189 | 1.6973 | 30.5 |
| $R_9$−1.399 | $S_4$ 0 | | |
| $R_{10}$+1.995 | $D_6$ .0399 | 1.613 | 55.7 |
| $R_{11}$−13.836 | | | | wherein $R_1, R_2 \ldots$ represent the radii of curvature of the individual surfaces counting from the front (the positive sign indicating that the surface is convex to the front and the negative sign that it is concave thereto), $D_1, D_2 \ldots$ represent the axial thicknesses of the individual elements, and $S_1, S_2, S_3$ represent the axial air separations between the components.

15. In optical apparatus for projecting an image of the profile of an object, the combination with the optical system claimed in claim 1, of a source of light of small size and a collimator for directing a collimated beam of light derived from such source past the object to the optical system, whereby an image of the profile of the object will be projected by the system.

16. In optical apparatus for projecting an image of the profile of an object, the combination with the optical system claimed in claim 6, of a source of light of small size, a collimator for directing a collimated beam of light derived from such source past the object to the optical system, a small stop located at the exit pupil of the system close in front of the front member thereof, and a projection screen for receiving the image of the profile of the object projected by the system.

17. In optical apparatus for projecting an image of the profile of an object, the combination with the optical system claimed in claim 5, of a source of light of small size, a collimator for directing a collimated beam of light derived from such source past the object to the optical system, a small stop located at the exit pupil of the system, such exit pupil lying within the front member of the system, whereby an image of the profile of the object will be projected by the system.

18. In optical apparatus for projecting an image of the profile of an axial section of a screwthread, the combination with the optical system claimed in claim 1, of an illuminating device disposed with its axis inclined to the optical axis of the system at an angle appropriate to the helix angle of the screwthread and comprising a source of light of small size and a collimator for directing a collimated beam of light derived from the source past the screwthread to the optical system, whereby an image of the profile will be projected by the system.

19. In optical apparatus for projecting an image of the profile of an axial section of a screwthread, the combination with the optical system claimed in claim 1, of an illuminating device disposed with its axis inclined to the optical axis of the system at an angle appropriate to the helix angle of the screwthread and comprising a source of light of small size and a collimator for directing a collimated beam of light derived from the source past the screwthread to the optical system, and a small stop located at the exit pupil of the system and elongated in the plane containing the optical axes of the system and of the illuminating device to suit the inclination of such device, whereby an image of the profile will be projected by the system.

20. In optical apparatus for projecting an image of the profile of an axial section of a screwthread, the combination with the optical system claimed in claim 1, of an illuminating device mounted to pivot about a point on the optical axis of the system so that its inclination to such axis can be adjusted to suit the helix angle of the screwthread, such device comprising a source of light of small size and a collimator for directing a collimated beam of light derived from such source past the screwthread to the optical system, whereby an image of the profile will be projected by the system.

CHARLES GORRIE WYNNE.